Sept. 20, 1949.  R. E. WHITAKER  2,482,392
MACHINE FOR TRIMMING BRANCHES FROM STANDING TREES
Filed Dec. 15, 1945  4 Sheets-Sheet 2
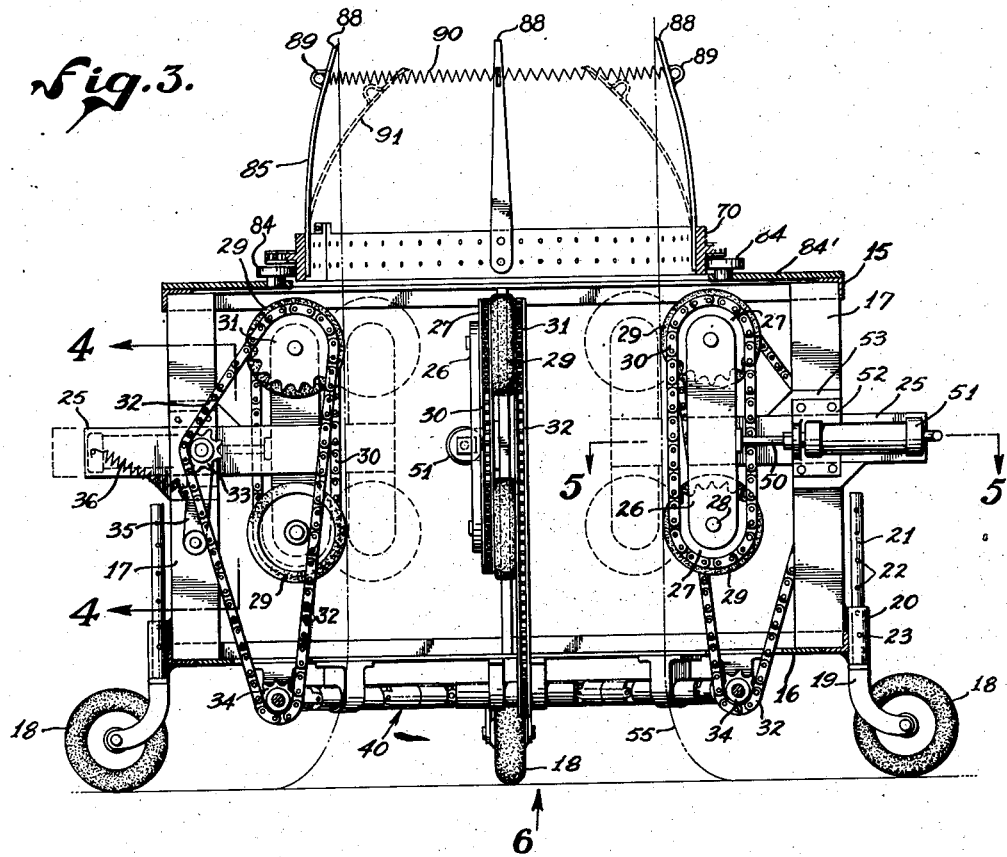
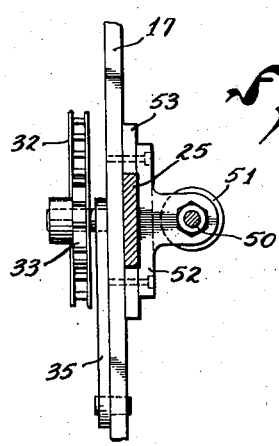
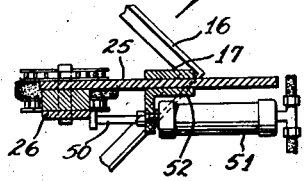
ROLFE E. WHITAKER,
INVENTOR.
BY
ATTORNEY.

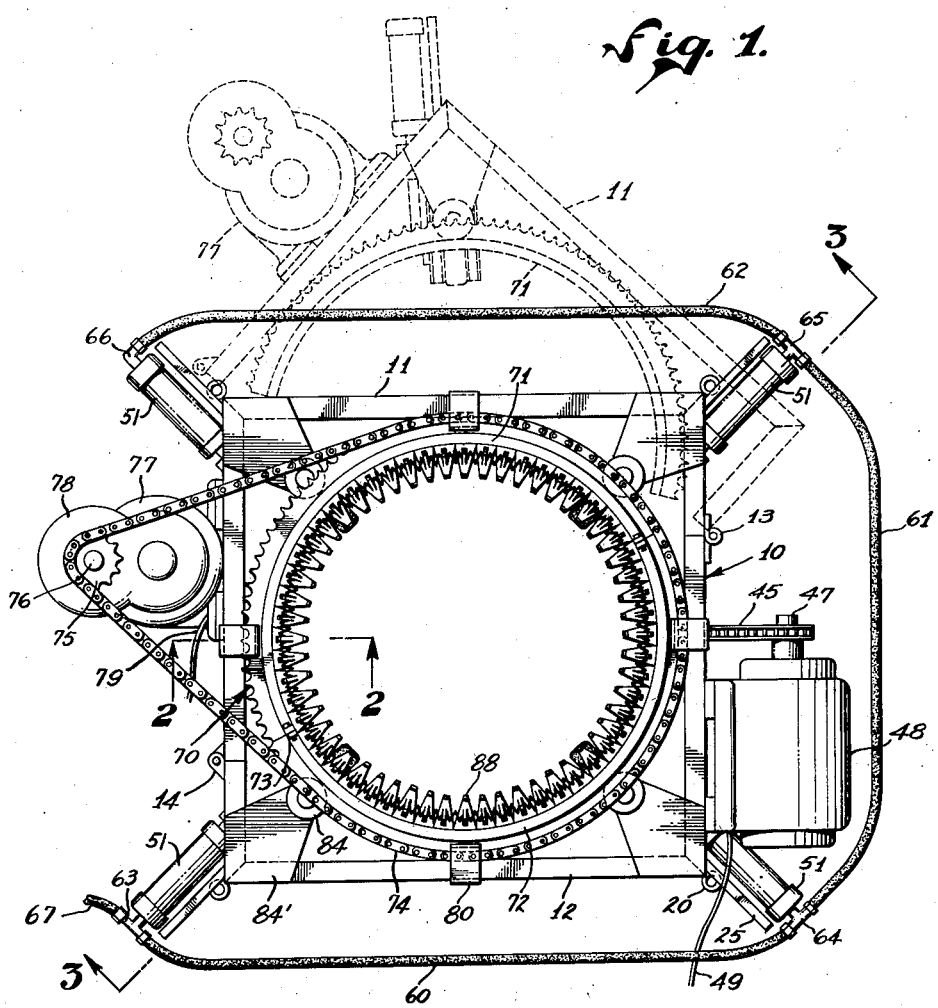
Sept. 20, 1949. R. E. WHITAKER 2,482,392
MACHINE FOR TRIMMING BRANCHES FROM STANDING TREES
Filed Dec. 15, 1945 4 Sheets-Sheet 1
ROLFE E. WHITAKER,
INVENTOR.
ATTORNEY.

Sept. 20, 1949.  R. E. WHITAKER  2,482,392
MACHINE FOR TRIMMING BRANCHES FROM STANDING TREES
Filed Dec. 15, 1945  4 Sheets-Sheet 3

ROLFE E. WHITAKER,
INVENTOR.

BY
*Herbert A. Huebner*
ATTORNEY.

Sept. 20, 1949.    R. E. WHITAKER    2,482,392
MACHINE FOR TRIMMING BRANCHES FROM STANDING TREES
Filed Dec. 15, 1945    4 Sheets-Sheet 4

ROLFE E. WHITAKER,
INVENTOR.

BY
Herbert A. Huebner
ATTORNEY.

Patented Sept. 20, 1949

2,482,392

UNITED STATES PATENT OFFICE 2,482,392

MACHINE FOR TRIMMING BRANCHES FROM STANDING TREES

Rolfe E. Whitaker, Los Angeles, Calif.

Application December 15, 1945, Serial No. 635,390

1 Claim. (Cl. 47—1)

The invention relates to tree trimmers and has particular reference to a machine equipped with cutting elements which is adapted to climb the trunk of the tree and during the course of its progress to cut off branches from the trunk. The device is especially useful in trimming the fronds from palm trees.

There are several varieties of palm trees which are commonly grown for ornamental purposes, and many of them attain considerable height. As these palm trees continue to grow the fronds or leaves sprout at the top, attain a full growth during which time they extend outwardly, and finally die as new fronds continue sprouting upwardly. The dead fronds continue to accumulate along the trunk of the tree as the tree grows upwardly, and unless they are trimmed off, they present a very ragged and unkept appearance. When the fronds die, they usually remain attached to the tree trunk for a considerable time unless they are torn from the trunk by the wind or are cut from the trunk by tree climbers. If palm trees of this particular sort are to be kept in a tidy appearance, the dead fronds must continually be trimmed from the trunk as the tree grows upwardly. Moreover, they need to be trimmed close to the trunk to give the tree a well-kept appearance.

Some of these trees grow to a very considerable height, and the job of trimming them becomes exceedingly laborious and expensive. In the past trimming has been done by tree climbers who, equipped with one type or another of tree climbing apparatus, climb the trunk of the tree and cut off the fronds, one by one. On other occasions it becomes necessary to build scaffolding about the tree or to reach the trimming area by means of extension ladders. This practice is expensive and requires a number of skilled workmen in order that the trimming job may be properly and safely accomplished.

It is therefore an object of the invention to provide a device for trimming the appendages from trees, and particularly palm trees, which is adapted to climb the tree by itself during the course of its trimming operation and thereby eliminate the necessity of providing scaffolding, extension ladders or tree climbing equipment which can be successfully used only by experienced tree climbers.

Another object of the invention is to provide a palm tree trimming apparatus which is entirely automatic in its operation and capable of being controlled from the ground so that no more than one or two workmen need be in attendance as the trimming device ascends the tree during the course of its trimming operation.

Still another object is to provide a palm tree trimming machine of sufficiently versatile construction to permit it being used upon all sections of the tree between the bottom and top regardless of how much the diameter of the tree may decrease toward the top.

A further object is to provide a palm tree trimming machine which is capable of efficient and successful use upon trees of various diameters and heights.

The invention further incorporates a means for readily moving the trimming machine from tree to tree which means can be released from the machine as the climbing and trimming operation proceeds in order to lessen the weight of the machine during its climbing operation.

Still further among the objects of the invention is to provide a quick, efficient and certain means of advancing an automatic tree trimmer upwardly along the trunk of the tree while at the same time providing a cutting apparatus which will continue to function as long as the trimming mechanism ascends but which will permit the trimming apparatus to freely descend, properly braked and controlled, after the trimming operation has been completed.

With these and other objects in view, the invention consists in the construction, arrangement and combination of the various parts of the device whereby the objects contemplated are attained, as hereinafter more fully set forth, pointed out in the claim and illustrated in the accompanying drawings, in which:

Figure 1 is a top plan view of one form of the automatic tree ascending and trimming mechanism comprising the invention.

Figure 2 is a fragmentary, longitudinal, sectional view taken on the line 2—2 of Figure 1.

Figure 3 is a longitudinal, sectional view of the trimming apparatus taken on the line 3—3 of Figure 1.

Figure 4 is a fragmentary, sectional view taken on the line 4—4 of Figure 3.

Figure 5 is a fragmentary, cross-sectional view taken on the line 5—5 of Figure 3.

Figure 6:
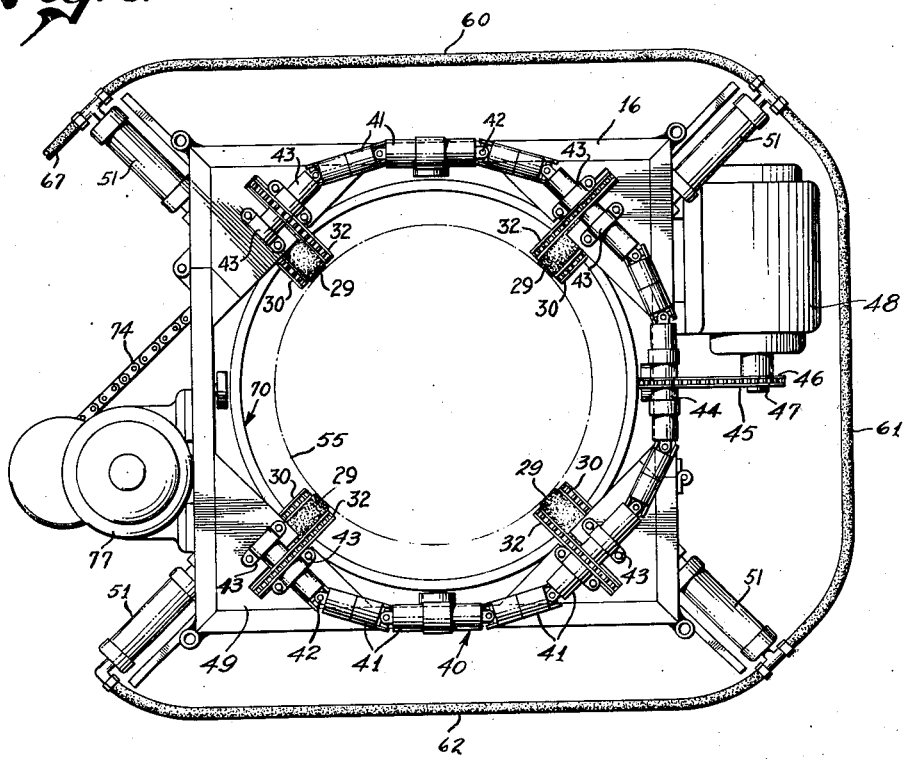
Figure 6 is a bottom view of the device as shown in Figure 3.

It is commonly known that palm trees of most types are trees having a single trunk and are without branches except for a cluster of fronds which grow from the top of the trunk. As the fronds grow, spread outwardly and eventually die, the stalk of the frond turns outwardly and then downwardly without, however, hugging the trunk. It often becomes a problem to cut the fronds off high up on the trunk. Some space, however, remains between the frond and the trunk, and the fronds can be cut from the trunk by a saw or other cutter which is pushed substantially in an upward direction against them. Since a frond cutter need not therefore travel in a horizontal direction, the problem lends itself more readily to solution by a machine operated frondage cutter which can both climb and trim the tree.

In order to provide an automatic climber and trimmer, it is therefore necessary to have a carriage which is adapted to advance up the trunk of the tree from the bottom toward the top equipped with a saw or other cutting instrument on the top side capable of progressively cutting one frond after another during the progress of the machine up the tree.

In an embodiment chosen to illustrate the invention there is shown a climbing and cutting apparatus comprising a square frame or carriage identified generally by the character 10 which consists of two parts 11 and 12 permanently hinged at one side by a hinge 13 and having a releasable lock 14 on the opposite side which may be secured by means of a pin or other suitable device. In Figure 1 the square frame is shown in the position it would have when encircling the trunk of a palm tree or while being moved from one position to another. The part 11 of the frame is shown pivoted to an open position by the dotted lines in Figure 1, a position the frame is adapted to take while it is being moved so as to encircle the trunk of a palm tree. Once the frame is locked in position about the base of the tree it is adapted to be moved automatically upwardly along the trunk by suitable climbers powered by an appropriate motor, and during its progress upwardly a second motor is adapted to rotate a circular saw which surrounds the tree so that the sawing action may progress as the apparatus climbs.

As will be more clearly apparent from Figure 3, each part of the frame is made up of an upper element 15, a lower element 16 and vertical columns 17 spaced so as to provide a sufficient support between the upper and lower elements. For supporting the frame as a whole there are provided wheels 18, one on each corner, mounted upon swivel carriages 19, each carriage being retained within a journal housing 20. At the upper portion of the carriage is a shaft 21 having a series of holes 22. The shaft has a free fit within the journal housing to permit it to slide endwise. To temporarily prevent endwise sliding a pin may be passed through a hole 23 in the journal housing into one of the holes 22 of the shaft to anchor the carriage to the frame in a position adjusted as to elevation. Whenever the frame is lifted during the course of its climbing up a tree trunk, the pins may be withdrawn and the carriages permitted to slip free of the journal housings. The wheels may by this expedient be left on the ground while the apparatus is performing its work on the tree.

To enable the frame to climb the tree trunk there are provided climbers located one on each corner of the frame, these being illustrated most clearly in Figures 3, 4 and 5. Each climber consists of a horizontal beam 25 to which is welded a vertical bracket 26. At each of the upper and lower ends of the vertical bracket is a gear 27 rotatably mounted upon a horizontal shaft 28. On one side of each gear is affixed a wheel 29 having a friction tread which is adapted to roll along the tree trunk. The gears 27 are connected together by a chain 30 so that the lower gear may be driven by the upper gear. In order to apply power to the upper gear, a second gear 31 is affixed to the wheel on the face opposite from the gear 27, and a drive chain 32 extends around the gear 31 over an idler gear 33 to a drive gear 34. The idler gear is mounted upon a link 35 which is normally drawn in an outward direction by means of a coiled spring 36 attached at one end to the link and at the other end to an extension of the horizontal beam 25. The purpose of the idler gear is to maintain the drive chain 32 taut as the climbers move in and out to engage a tree trunk of lesser or greater diameter.

In order to apply power simultaneously to all of the climbers at the same rate, there is provided a universal drive shaft indicated generally by the reference character 40 and shown in bottom plan view in Figure 6. The universal drive shaft comprises individual links 41 connected together by a series of universal joints 42. The universal drive shaft is supported at each corner of the frame by a pair of bearings 43 mounted upon corner plates 49.

Midway between the ends of the universal drive shaft is a sprocket gear 44 which is connected by means of a drive chain 45 to a drive gear 46 on a shaft 47 of a geared head motor 48. The motor is permanently mounted upon one side of the frame with its shaft rotating in a horizontal plane. Power for the motor may be supplied through wires 49 (Fig. 1) which can be payed out from the ground and the operation of the motor controlled by suitable electric control devices of a well-known sort connected into the wire which supplies power to the motor. Although an electric motor is shown, it is contemplated that other types of motors may be found equally applicable.

When the geared head motor 48 is operated, the universal drive shaft is rotated which in turn rotates each of the gears 34 at the same rate, these gears being adapted to drive each of the climbers likewise at the same rate and thereby advance the frame up the tree trunk. By reversing operation of the motor, the frame may be moved down the tree trunk. Brakes may be provided, if necessary, depending upon the type of motive power selected.

In order that the climbers may be in close contact with the tree trunk at all times to provide sufficient traction for the treads of the wheels, each of the brackets 26 is attached to a piston rod 50 of a hydraulic ram 51 which is mounted with its axis in a horizontal direction on the frame at approximately the mid-point of the bracket. By operation of the hydraulic ram the piston rod 50 is moved inwardly or outwardly. Movement of the piston rod causes the beam 25 to slide inwardly or outwardly, the beam being supported upon the vertical column 17 by means of a bracket 42 held in spaced relation to the beam by blocks 53. The bracket 52 also provides a mounting for the hydraulic ram. A certain limited freedom of motion may be permitted the beam 25 with respect to the blocks 53 so that it may tilt a slight amount from a vertical direction to permit the wheels at the opposite ends to follow the surface of a tree trunk which tapers toward the top. In Figures 3 and 6 a tree trunk 55 is shown by a dot and dash line.

To operate the hydraulic rams there is provided a hydraulic line comprising sections 60, 61 and 62 connected respectively to fittings 63, 64, 65 and 66 on the rams. The hydraulic line is fed by means of a conduit 67 from a source of hydraulic power which may be maintained near the base of the tree. The conduit 67 may be of sufficient length to permit it to be payed out as the frame climbs the tree. Although a hydraulic ram is specifically designated, it will be appreciated that air may be substituted or even a motor means other than those operated by fluid pressure be utilized.

In order to trim the fronds or growing appendages from the trunk of a palm tree, there is provided a frondage cutter which encircles the tree trunk and is operated through a repeated circumferential cutting cycle as the frame or carriage automatically ascends the tree trunk. In the embodiment illustrated in Figures 1, 2 and 3 the frondage cutter comprises a ring gear indicated generally by the reference character 70 which consists of two separable parts 71 and 72 which are adapted to be joined together by some quick connecting means at the ends so that the ring gear may be opened together with the frame as the apparatus is applied around a tree trunk. The ring gear is driven by a chain 74 which extends outwardly at one side of the frame, passing around a sprocket 75 which is keyed to a motor shaft 76 on a geared head motor 77. A gear reduction box 78 may be provided where necessary in order to reduce the speed of rotation of the ring gear.

To support the ring gear on the frame there are provided a plurality of bearings comprising brackets 80, one secured at the mid-portion at each side of the frame. Adjacent the bracket is a wheel bearing 81 (Fig. 2) supported on a stub shaft 82 attached to the frame part 15 in a position such that the ring gear is adapted to rest and rotate upon the circumference of the wheel bearing. In order to hold the ring gear in place, the bracket is provided with a turned down lip 83 at the end which is directed against the top face of the ring gear at a point opposite from the circumference of the wheel bearing. The ring gear is maintained in position by means of bearing wheels 84 rotatably mounted upon plates 84' which extend radially inwardly from each corner of the frame. The bearing wheels 84 rotate in a horizontal plane against the cylindrical side surface of the ring gear. The geared head motor may be operated by remote control through a power line 79.

Cutting elements are mounted upon the ring gear and comprise a series of flexible arms 85 secured to a cylindrical portion 86 of the ring gear by some suitable means such as bolts 87. The flexible arms in the embodiment shown extend in a substantially vertical direction upwardly and terminate each in a pointed top 88 having a cutting edge on the advancing side. An eyelet 89 may be provided on the arm adjacent the upper or free end and a coiled spring 90 passed through the eyelets of all of the arms and joined at the ends so that tension in the spring tends to draw the cutting edges at the free ends of the arms together inwardly toward the trunk of the tree at all times. As the frondage cutter ascends the trunk of the tree and the diameter gradually decreases the arms will be drawn inwardly toward the dotted position 91 illustrated in Figure 3. When the frondage cutter in company with the frame descends, the spring will permit the arms to expand and extend outwardly following the trunk as the diameter grows larger toward the bottom. Inasmuch as the cut is made by passing the cutters circumferentially about the tree trunk and in an upward direction rather than an inward direction, there is no likelihood of the free ends of the arms catching in the surface of the trunk of the tree and thereby either damaging the frondage cutter or preventing ascent of the frame.

It will be apparent from the foregoing description that the apparatus may be applied to a tree trunk by opening the parts of the frame together with the ring gear. During application of the device in this manner the chain 74 will also need to be broken and applied again to the ring gear after the frame and the ring gear have been closed and secured around the base of the tree trunk. After the apparatus is in place hydraulic pressure will be applied to the hydraulic rams 51 which will thereupon exert sufficient force upon the brackets 26 to force the wheels 29 into engagement with the trunk so that there is traction between the wheel treads and the tree trunk. Hydraulic pressure will be under constant application to progressively advance the wheels as the trunk gets smaller.

The electric motor 48 may then be started by a switch located on the ground, and the wheels 29 will begin rotating, moving the climbers and the frame up the tree trunk. The frondage cutter will be carried in advance of the frame, and when the waste fronds are encountered, the electric motor 70 may be started by remote control and the arms 85 and their cutting tips started revolving around the tree trunk. Movement upward of the frame and frondage cutter may be controlled at a pace sufficiently slow to permit a sawing or cutting action of the cutting edges 88 so that each frond in its turn is cut off as it is encountered by the frondage cutter. After the fronds have been cut off to a sufficient height, the motor 77 may be shut off and the motor 48 reversed to move the frame down the tree trunk. During this operation it is preferable to maintain a certain amount of hydraulic pressure so that traction between the wheels 29 and the tree trunk continues to be sufficient to prevent the frame from dropping too suddenly. Hydraulic pressure, moreover, will act as a brake by restraining to a degree movement of the wheel brackets 26 radially outwardly as the diameter of the trunk enlarges.

Figure 7:
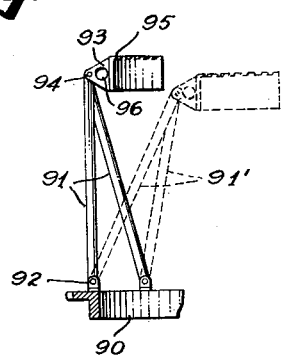
Figure 7 is a fragmentary, longitudinal, sectional view showing a cutting member of a modified type.
Figure 8:
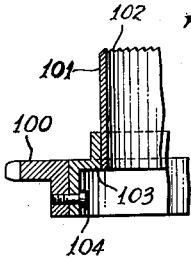
Figure 8 is a fragmentary, sectional view of another modified form of frondage cutter.

A modified form of frondage cutter is illustrated in Figure 7 wherein a ring gear 90 has mounted thereon pairs of vertical supports 91 pivoted at the points 92 to the ring gear so that the supports may move from an outward full line position, as shown in Figure 7, to the dotted positions 91' there shown. The supports are joined at the top and connected to a saw segment 93 by means of a pin 94, the saw segment having inwardly and upwardly directed teeth 95. For drawing the saw segments inwardly against the tree trunk a coiled spring of the type previously referred to may be passed through holes 96 in the saw segments.

In a second modified type of frondage cutter a ring gear 100 is provided with cylindrical segments 101 having saw teeth 102 at the upper edges. The segments may be welded or otherwise attached to segmental brackets 103, in turn adapted to be secured to the ring gear at spaced locations by means of machine screws 104. When appendage cutters of this sort are used, they will need to be changed and segments of a different radius of curvature substituted where trunks of trees of different diameters are encountered. The location of the segmental cutters with respect to the ring gear may be varied by changing the size of the segmental brackets 103 so that segmental cutters are spaced at a greater or lesser distance radially from the ring gear.

Figure 9:
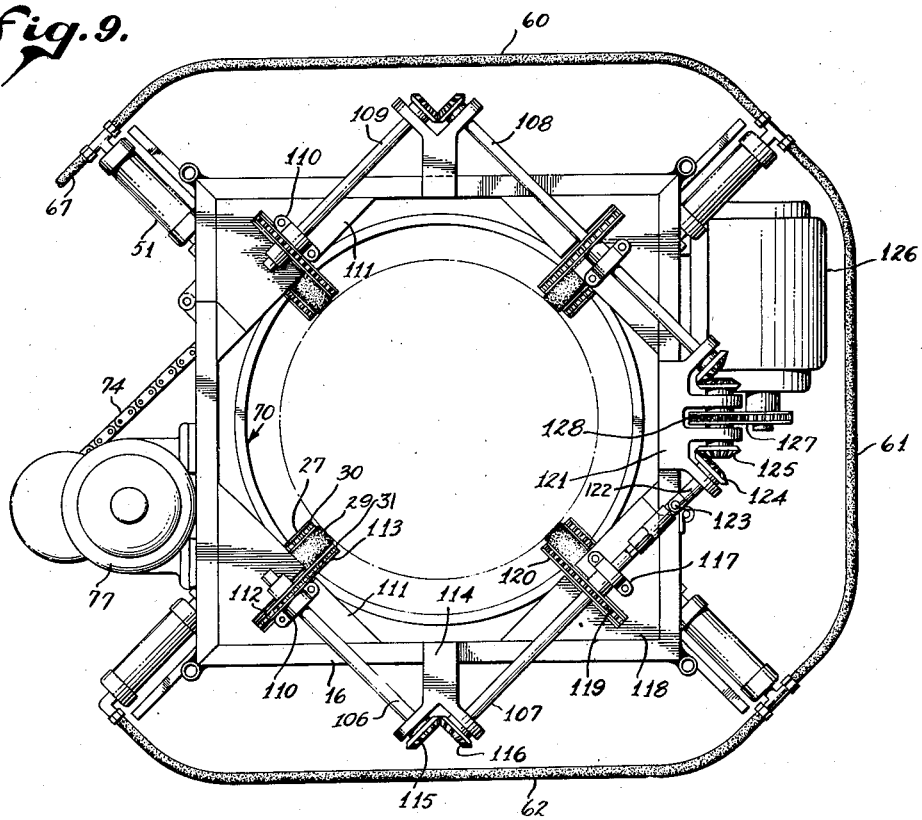
Figure 9 is a top plan view of a modified type of climbing and trimming apparatus.

On occasions it may be desired to dispense with a universal drive shaft such as the drive shaft 40 described in connection with Figures 1, 3 and 6. A suitable substitute may consist of a series of separate unitary shafts identified by the reference characters 106, 107, 108 and 109. As shown in Figure 9, the short shafts 106 and 109 are provided with journal brackets 110 located on corner plates 111 and sprockets 112 at the journalled ends provided with drive chains 113 connected in the usual manner to gears 31 on the climbers. The ends of the short shafts are journalled in Y brackets 114. The short shafts 106 and 109 are angularly disposed relative to the respectively adjacent long shafts 107 and 108. Bevel gears 115 and 116 respectively on the short and long shafts permit the short shafts to be driven by the long shafts. One end of each long shaft is journalled in the Y bracket and the other end secured by a journal bracket 117 mounted upon a corner plate 118, in turn secured to the frame. The long shafts are likewise provided with sprockets 119 which by means of drive chains 120 are connected to the respective climbers.

A composite bracket 121 provides a mounting for a stub shaft 122 on each side which is in turn connected by a universal joint 123 to the respectively adjacent long shaft. Bevel gears 124 on the stub shafts meshing with bevel gears 125 on a suitable idler shaft transfer power from a geared head motor 126 through a drive chain 127 to the sprocket 128 which is keyed to the idler shaft. In other respects the modified form shown in Figures 9 and 10 is constructed and operates in the same manner as the first described form.

Figure 10:
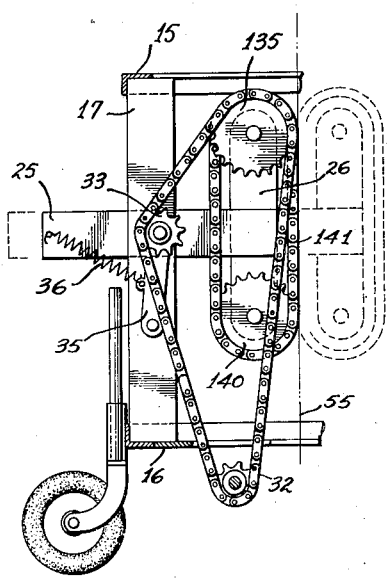
Figure 10 is a fragmentary, longitudinal, sectional view showing a modified type of climbing element.

A modified type of climber is illustrated in Figure 10. In the modified climber there is provided the usual beam 25 and bracket 26 welded thereon. At the upper and lower ends of the bracket are gears and sprockets 135 and 140 which are driven by the previously described chain 32. In this instance, however, a chain 141 which interconnects the gears 135 and 140 actually provides a traction surface for engagement with the tree trunk 55, replacing the wheels described in connection with the first form. In other respects the modification of Figure 10 follows the same pattern as the first described form.

By the provision of an automatic frondage cutter of the type herein described there has been provided a machine which can readily be applied to a palm tree of virtually any size and once applied around the tree can be operated by controls located on the ground which guide the apparatus so that it climbs the trunk of the tree to positions of engagement of the frondage cutter elements with the fronds at points adjacent the bases thereof. Likewise, by controls operated from the ground the cutting elements may be rotated and the fronds cut off one by one. Upon completion, the entire apparatus may be lowered at a suitable rate of speed to the ground and then readily removed and transported to the next tree.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claim so as to embrace any and all equivalent structures.

Having described my invention, what I claim as new and desire to secure by Letters Patent is:

In a tree trimming machine, an annular frame formed of separable sections adapted to be disposed detachably around a standing tree trunk and supported thereby, an annular unit formed of separable sections rotatably supported by said frame, means for rotating said unit relatively to the frame, cutters carried by said unit for engagement with the tree trunk, and motor driven traction means carried by the frame for engagement with the tree trunk for moving the machine lengthwise thereof, the simultaneous rotation of said unit and lengthwise movement of said frame causing the cutters to execute a helical cutting operation.

ROLFE E. WHITAKER.

REFERENCES CITED

The following references are of record in the file of this patent:

UNITED STATES PATENTS

| Number | Name | Date |
|---|---|---|
| 186,944 | Nudd | Feb. 6, 1877 |
| 397,114 | Dolsen | Feb. 5, 1889 |
| 742,447 | Kidder | Oct. 27, 1903 |
| 957,473 | Olafson | May 10, 1910 |
| 1,114,505 | Moore | Oct. 20, 1914 |
| 1,243,294 | Hruska | Oct. 16, 1917 |
| 1,299,289 | Berg | Apr. 1, 1919 |
| 1,607,784 | Spangler | Nov. 23, 1926 |
| 2,174,525 | Padernal | Oct. 3, 1939 |

FOREIGN PATENTS

| Number | Country | Date |
|---|---|---|
| 216,774 | Germany | Dec. 3, 1909 |
| 722,254 | France | Dec. 28, 1931 |